United States Patent
Welz et al.

(10) Patent No.: US 8,845,267 B2
(45) Date of Patent: Sep. 30, 2014

(54) POD DRIVE

(75) Inventors: Dierk Welz, Hannover (DE); Uwe Wenzel, Hildesheim (DE); Rainer Mischak, Wietze (DE)

(73) Assignee: RENK Aktiengesellschaft, Augsburg (DE)

(*) Notice: Subject to any disclaimer, the term of this patent is extended or adjusted under 35 U.S.C. 154(b) by 715 days.

(21) Appl. No.: 13/058,986

(22) PCT Filed: Jul. 23, 2009

(86) PCT No.: PCT/DE2009/001032
§ 371 (c)(1),
(2), (4) Date: Feb. 14, 2011

(87) PCT Pub. No.: WO2010/017797
PCT Pub. Date: Feb. 18, 2010

(65) Prior Publication Data
US 2011/0135452 A1 Jun. 9, 2011

(30) Foreign Application Priority Data
Aug. 14, 2008 (DE) .......... 10 2008 037 677

(51) Int. Cl.
*F04D 29/28* (2006.01)
*B63H 23/32* (2006.01)
(52) U.S. Cl.
CPC ................... *B63H 23/321* (2013.01)
USPC .............. 415/34; 415/113; 415/132; 415/229

(58) Field of Classification Search
USPC ............ 415/33, 34, 110, 111, 113, 131, 132, 415/229; 416/174, 245 A, 244 B
See application file for complete search history.

(56) References Cited

U.S. PATENT DOCUMENTS

| 2,714,866 A | 8/1955 | Pleuger et al. | |
| 5,408,155 A * | 4/1995 | Dickinson et al. | 310/90 |
| 8,118,117 B2 * | 2/2012 | Ide et al. | 175/107 |

FOREIGN PATENT DOCUMENTS

FR 2261443 * 2/1974 ............. F16C 17/04

* cited by examiner

*Primary Examiner* — Ned Landrum
*Assistant Examiner* — Woody A Lee, Jr.
(74) *Attorney, Agent, or Firm* — Cozen O'Connor

(57) ABSTRACT

A propeller pod drive for a vessel has at least one driveshaft for driving a propeller, at least one radial bearing arrangement for receiving radial forces, at least one axial bearing arrangement for receiving axial forces of the driveshaft. A thrust collar is supported in axial direction on at least one side in axial direction at a guide device, and a supporting structure for arranging the at least one radial bearing arrangement and the axial bearing arrangement. The guide device has at least three, axial sliding segments arranged in a segment guide and each of which has a sliding surface in contact with the thrust collar.

25 Claims, 8 Drawing Sheets

POD DRIVE

PRIORITY CLAIM

This is a U.S. national stage of Application No. PCT/DE2009/001032, filed on Jul. 23, 2009, which claims priority to German Application No: 10 2008 037 677.9, filed: Aug. 14, 2008, the contents of which are incorporated herein by reference.

BACKGROUND OF THE INVENTION

1. Field of the Invention

The present invention is directed to a propeller pod drive (pod drive) with improved radial bearings and axial bearings.

2. Related Art

Propeller pods (pods) have been used as drives in shipbuilding for some time. In contrast to conventional ship's drives, the drive elements are not accommodated in the hull of the ship, but rather outside the hull in a pod attached to the hull. Thrust screws and traction screws, as well as combinations thereof, can also be used. Aside from ships, pod drives can also be used for other watercraft such as boats, torpedoes, drones, and floating infrastructures such as drilling rigs or other large industrial or urban marine structures for locomotion, maneuvering, and/or stabilization.

The propeller shaft is often driven by an electric motor accommodated in the pod; the energy for operating the electric drive is supplied by a diesel generator, for example. Therefore, it is no longer necessary to provide a mechanical connection from the ship's diesel engine to the ship's screw by a shaft. Rather, the pod drive obtains its energy from the diesel generator by power supply lines. Therefore, the arrangement of the diesel generator is subject to far fewer constructional limitations than a conventional screw drive. However, arrangements in which the output torque of a motor accommodated in the ship's hull is mechanically transmitted to a screw driveshaft in the pod by a coupling arrangement, articulated arrangement and/or transmission arrangement are also possible.

The pod advantageously has a streamlined, watertight cladding and can be fastened to the hull to be rotatable by up to 360 degrees so that the pod drive can also take over the function formerly performed by the rudder. Owing to the fact that the ship's motor can be used for maneuvering in any azimuthal direction in a pod drive of this kind, it is possible to achieve movements and curve radii which are not possible with conventional ship's motors having a rigid axle and rudder or which are only possible with auxiliary maneuvering devices. In particular, at least rear thrusters that were formerly required for maneuvering especially between harbor and open sea can be entirely dispensed with. Pods that are rigidly arranged at the hull and arrangements having a plurality of pod drives in which some of the drives have rigid pods are also possible.

U.S. Pat. No. 2,714,866 discloses a pod drive in which the radial forces of the screw driveshaft are supported by slide bearings and the axial forces of the screw driveshaft are supported by a disk which is arranged on the shaft and is supported at guide elements or supporting elements. However, the principle of the pod drive was not put to use commercially to a significant extent until about 40 years after the appearance of this publication, i.e., in the 1990s. The slide bearing solution was not pursued further; rather, all pod drives in use today have rolling bearings. This may be because rigid slide bearings such as those proposed in the above-cited reference quickly become unusable in the event of axial misalignments, i.e., tilting of the driveshaft, due to uneven or localized wear.

However, existing solutions utilizing rolling bearings also have drawbacks which, in spite of the significant technical and economic advantages of the pod drive in theory, have so far thwarted a more widespread use of this technology. For example, the rolling bearings are loaded by extremely high tensile forces, thrust forces and weight forces and the rolling elements and running surfaces therefore experience comparatively considerable friction. On one hand, this leads to comparatively high friction losses as well as severe bearing wear, which has a direct impact on service life. Therefore, regular and frequent servicing is required to avoid failure of the bearings. The bearings are conventionally flanged to the pod structure and can only be serviced or replaced by dismantling the pod. Such work is expensive and can only be performed in dock.

SUMMARY OF THE INVENTION

It is an object of the present invention to provide a pod drive which is improved over the prior art with respect to maintenance friendliness.

According to one embodiment of the invention, a propeller pod drive for a vessel has at least one driveshaft for driving a propeller, at least one radial bearing arrangement for receiving radial forces of the driveshaft, at least one axial bearing arrangement for receiving axial forces of the driveshaft, wherein a thrust collar of the driveshaft is supported on one or both front sides in axial direction at a guide device, and a supporting structure for arranging the radial bearing arrangement and the axial bearing arrangement. The guide device has at least three, preferably an integer multiple of four, particularly eight or twelve, axial sliding segments which are arranged in a segment guide and which each have a sliding surface in contact with the thrust collar.

Therefore, even when axial misalignments occur in the driveshaft and lead to uneven wear at the axial bearing, it is no longer necessary to exchange the entire axial bearing, but rather it is possible to exchange only individual segments, which saves resources and reduces maintenance costs.

The axial sliding segments are preferably arranged in at least one running groove in the segment guide. The axial sliding segments can be connected to one another by a link arrangement and are movable in circumferential direction inside the running groove. The segment guide has a closable opening for the insertion and removal of axial sliding segments. An arrangement of this kind makes it possible to perform maintenance on the axial bearing and, if necessary, also to replace individual segments, without completely dismantling the bearing, reassembling it and possibly readjusting the shaft. In particular, it is advantageously no longer necessary to dock the vessel in order to carry out this work; rather, the work can be performed at any time and in any place. The axial bearing need only be kept substantially free from forces, which, in the case of external flow forces, can be accomplished by fixing the driveshaft by a separate securing device.

When the link arrangement is an individual articulated link, it is possible for the string of axial sliding segments to be moved in its entirety back and forth in circumferential direction. A multi-link chain or a flexible fink, for example, a cable, allows a certain longitudinal compensation, but can only move and hold the string of axial sliding segments tractively.

The opening is preferably located at the upper side of the segment guide. In this case, the string of axial sliding segments can be inserted in a simple manner using the force of gravity. Insertion is especially simple when the string is divided into two partial strings which are inserted into the segment guide in opposite circumferential directions.

The axial sliding segments can be flexible in axial direction. Accordingly, when axial misalignments or bending occurs in the driveshaft, the axial load is received in a uniform manner by the axial sliding segments. This prevents local pressure peaks and singular wear of individual axial sliding segments. Accordingly, maintenance intervals can also be longer and operating costs can be reduced.

When one or more, preferably all, of the axial sliding segments have an axial suspension, the advantages mentioned above can be achieved by well-known, manageable structural component parts. An axial suspension preferably has at least one disk spring, in particular a disk spring arrangement comprising a plurality of disk springs. Disk springs can support especially high loads and can be coupled in a simple manner, which is especially advantageous in view of the high thrust forces of a ship's drive.

The axial suspension is preferably preloaded at the axial sliding segment. In this way, axial play between the suspension and segment can be prevented; on the other hand, the axial play between the segment guide, segment, and thrust collar can be adjusted easily. In particular, the axial sliding segments can be preassembled with the spring arrangement as a stable and easily manageable subassembly.

The segment guide can be incorporated directly in a bearing housing or can be integrated therein or received in the bearing housing as an individual structural component part and can be supported at the bearing housing in an axially flexible manner at least at three points distributed along the circumference. In this way, the ring of axial sliding segments can be supported on bearings in its entirety, which allows an even more uniform distribution and makes it possible to decouple the entire system from vibrations.

The support of the segment guide can have at least one disk spring, in particular a disk spring arrangement comprising a plurality of disk springs, arranged at the segment guide or at a bearing housing. The advantages of disk springs have already been mentioned. This also applies analogously to a preferable preloading of the springing support.

In addition or alternatively, the support can also be carried out by hydraulic compensation cells connected to one another by hydraulic lines. The hydraulic compensation cells are arranged at the segment guide and/or at a bearing housing. Depending on the load case, a hydraulic fluid is preferably exchanged between compensation cells until the plane of the axial sliding segments is adjusted to a state of equilibrium.

One or more radial bearing arrangements can be arranged in a bearing housing so as to be spherically movable by a spherical cap. In this way, a bearing bushing which is typically used for radial slide bearings can follow the angular position of the shaft axis. Therefore, uneven wear can be prevented, the service life of the radial bearing is increased, and maintenance intervals can be longer.

A radial bearing arrangement and an axial bearing arrangement can advantageously form a single bearing assembly. In this way, the available space can be maximized. In so doing, in order to prevent radial deflections of the axial bearing arrangement, it is advantageous when the radial bearing arrangement in the bearing assembly has two half-bearings which are arranged symmetrically in axial direction around the axial bearing arrangement. The tilting to be compensated for by the axial sliding segments can be minimized, and the bearing assembly can be integrated particularly well and, therefore, can be compact.

Each half-bearing preferably forms a half-cap, the two half-caps being arranged symmetrically with respect to the thrust collar in axial direction and together form a spherically movable cap. A particularly advantageous and compact arrangement results when the segment guides are arranged in each instance on the half-caps or are integrated therein. With an arrangement of this kind, the advantages of the flexible axial bearing support and those of the spherically tracking radial bearing support can be combined. Owing to the fact that the axial bearing arrangement in its entirety also follows the angular position of the shaft axis and, therefore, also the angular position of the thrust collar, the differences to be compensated by the flexibility of the individual axial sliding segments are minor and the compensation paths can be smaller. Further, the spring deflection is then preferably available for absorbing axial pressure variations and shocks.

According to a preferred embodiment, the radial bearing arrangements and the axial bearing arrangements have a joint face, in particular a horizontal joint face, which extends through the axis of rotation and at which the bearing arrangements can be separated and put together. When the joint face includes all of the structural components, i.e., the bearing housing as well as the radial bearing shells, segment guides, and spherical caps, individual bearings or bearing parts can be dismantled, serviced and, if necessary, replaced without removing the shaft, without dismantling the entire propeller pod, and without having to realign the bearings to the supporting structure of the pod. In particular, all essential maintenance work can be performed without docking, which substantially reduces the maintenance costs and, therefore, the long-term operating costs of a ship outfitted with a drive of this kind.

According to one embodiment of the invention, a slide bearing arrangement is designed for and geared toward use in a drive device of the type described above and to a vessel, in particular a ship, boat, combat vessel, reconnaissance vessel, submersible, or floating infrastructure, which is outfitted with a propeller pod drive or a slide bearing arrangement according to the above description.

BRIEF DESCRIPTION OF DRAWINGS

Other features and advantages of the present invention are indicated in the following description of the drawings and embodiment forms shown therein. In the partially schematic drawings.

DETAILED DESCRIPTION OF THE DRAWINGS

Figure 1:
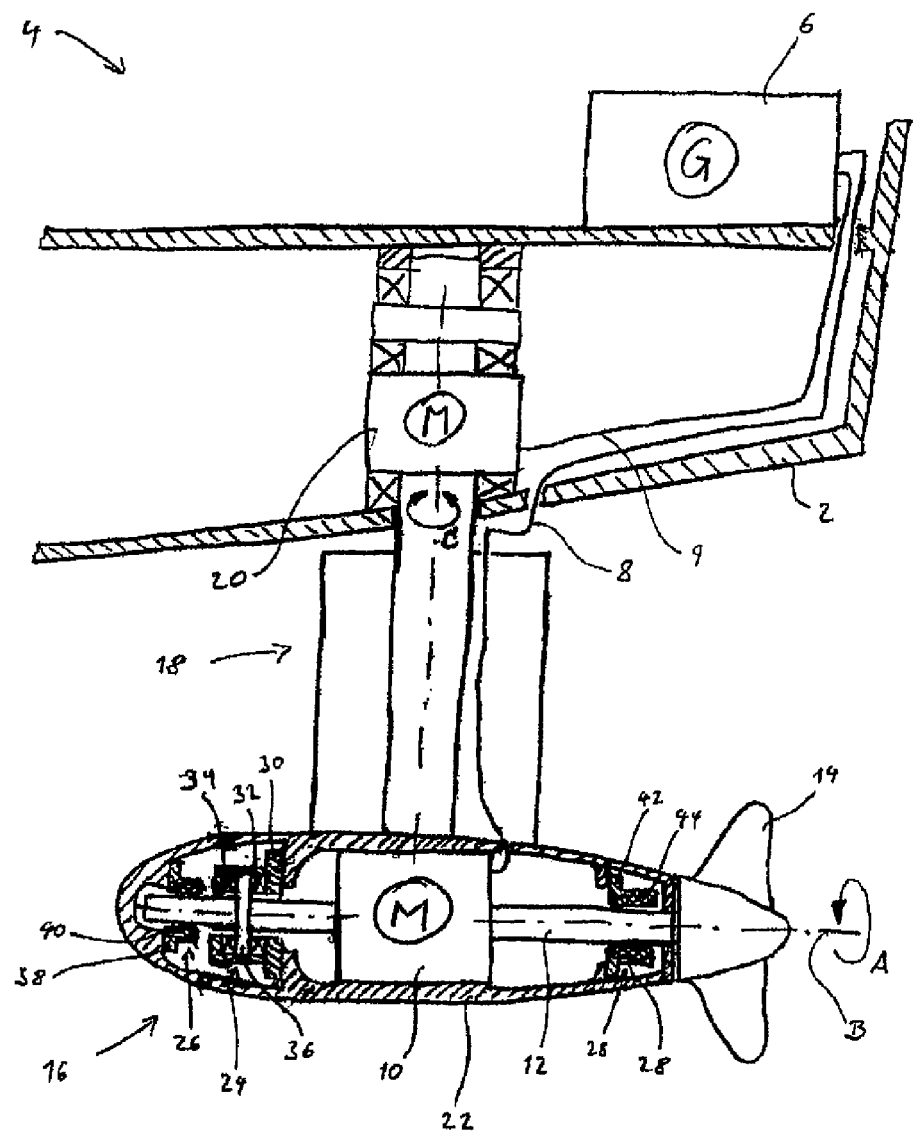
FIG. 1 is a basic construction of an example of a propeller pod according to the invention.

FIG. 1 shows a basic construction of a propeller pod according to one embodiment of the invention which is shown by way of example.

An electric generator 6 is arranged in a hull 2 of a vessel 4. The electric generator 6 is connected by electrical lines 8 to an electric motor 10 which drives a propeller 14 (see arrow direction A) by a shaft 12. The shaft axis is designated by B in the drawing. The electric motor 10 and the shaft 12 are arranged in a pod 16 which is connected to the hull 2 by a suspension 18. The pod 16 is swivelable in azimuthal direction (see arrow direction C) by a pod swiveling drive 20 which is likewise supplied with power by the generator 6 via electrical lines 9. Further, the pod 16 has a supporting structure 22.

The shaft 12 is supported by an axial slide bearing 24, a first radial slide bearing 26, and a second radial slide bearing 28 which are in turn fixed to the supporting structure 22 of the pod 16. The axial slide bearing 24 has a bearing housing 30 and two slide guides 32, 34 which support a thrust collar 36 that is formed integral with the shaft 12. The first radial slide bearing 26 has a bearing housing 38 and a bearing ring 40 in which the shaft 12 runs. The second radial slide bearing 28 likewise has a bearing housing 42 and a bearing ring 44 in which the shaft 12 runs. The bearing housings 30, 38, 42 are each fastened to the supporting structure 22 of the pod 16 by flange portions.

Figure 2:
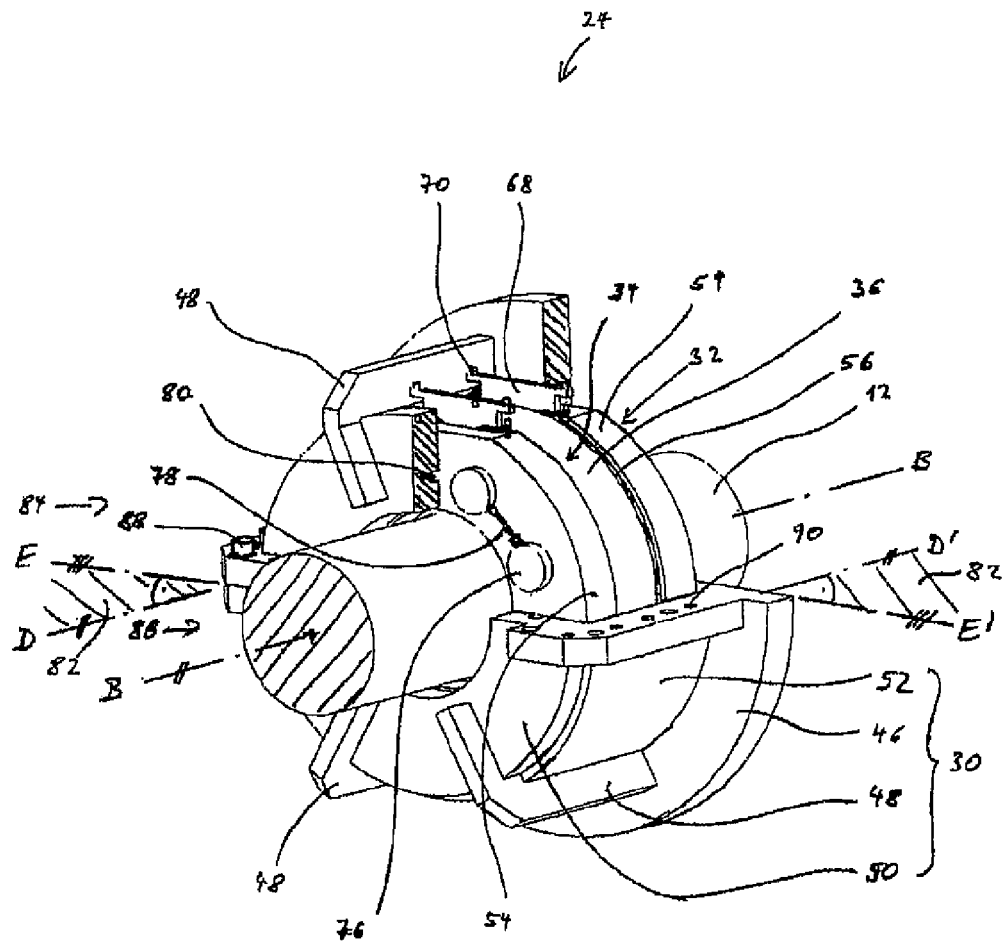
FIG. 2 is a construction of an axial slide bearing according to a first embodiment of the invention with hydraulically supported segment guide.

FIG. 2 shows an axial bearing 24 in a first embodiment form of the invention. The shaft 12 with its axis B and the thrust collar 36, the bearing housing 30 and the slide guides 32, 34 of the axial bearing 24 are shown in perspective in the drawing. The upper right quadrant of the bearing housing 30 is omitted from the drawing so that the parts located inside the bearing housing 30 may be seen.

As can be seen from the drawing, the bearing housing 30 is divided into a flange portion 46, a plurality of rib portions 48, a cover portion 50 which is located opposite the flange portion 46 in axial direction and which closes the bearing housing 30 on this side, and a shell portion 52 that closes the bearing housing on the radially outer side. The flange portion 46 and the cover portion 50 each have an opening through which the shaft 12 projects. Shaft seals which seal the bearing housing 30 relative to the shaft 12 can be provided but are not shown in more detail in the drawings.

The slide guides 32, 34 each have a segment carrier 54 that carries a plurality of axial sliding segments 56. In this embodiment, the axial sliding segments 56 have a cylindrical shape, are received on one side in the segment carrier 54 and, on the other side, have a sliding surface on which the thrust collar 36 of the shaft 12 is supported. The details of the axial sliding segments 56 are described more with reference to FIG. 3.

Figure 3:
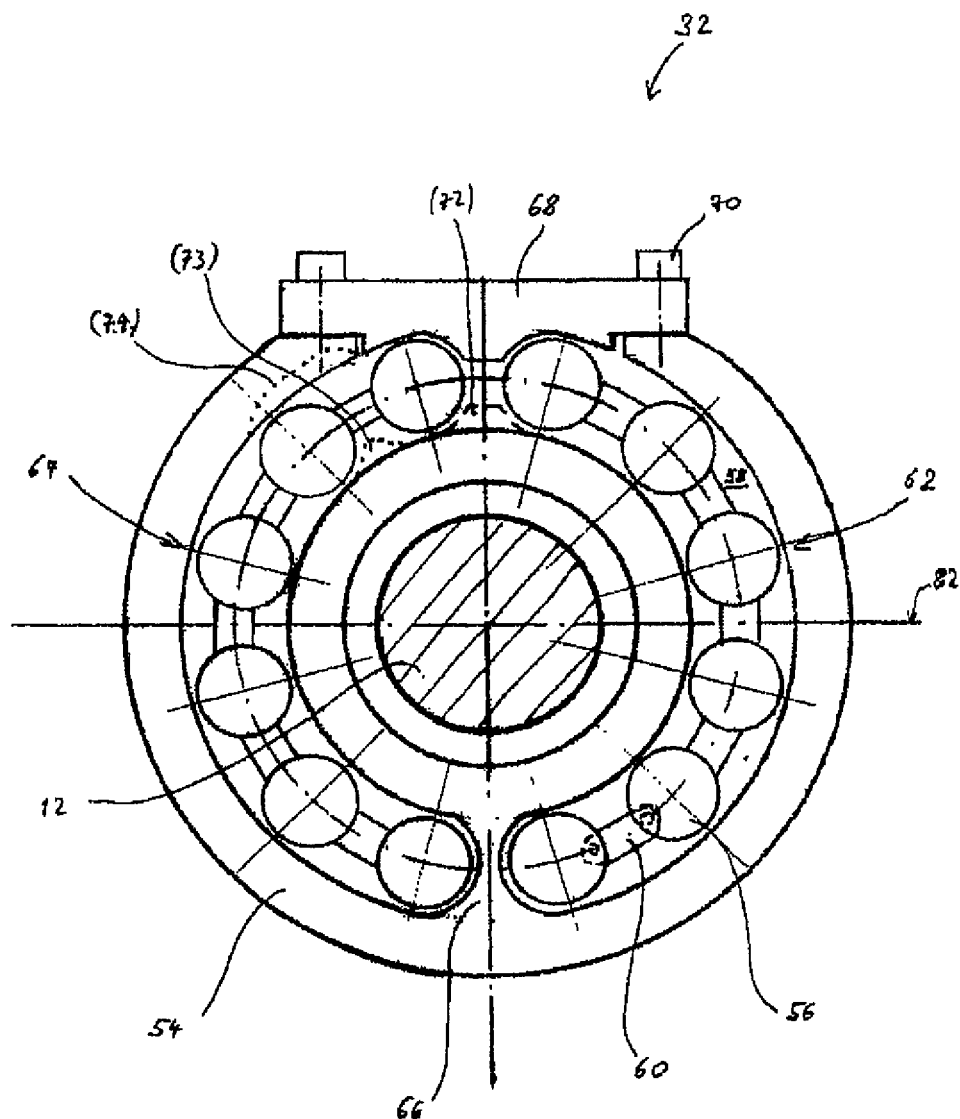
FIG. 3 is a construction of a slide guide with axial sliding segments according to the invention.

The slide guide 32 with the segment carrier 54 and axial sliding segments 56 together with the shaft 12 are shown in a top view in FIG. 3 considered from the side of the thrust collar 36.

The segment carrier 54 has an annular running groove 58 on the side facing the thrust collar 36. A total of twelve axial sliding segments 56 are received in this running groove 58 in such a way that they are movable along the running groove 58. Two successive axial sliding segments 56 are connected to one another in an articulated manner in each instance by a link 60. In the specific embodiment form, six axial sliding segments 56 are connected to form two half-chains 62 and 64 to facilitate handling. In the lower area of the segment carrier 54, the running groove 58 is interrupted by a web 66 at which each of the half-chains 62, 64 is supported; this prevents the bottommost axial sliding segments 56 from colliding with one another under the influence of gravity.

In the upper area, the running groove 58 opens upward in the form of a slot which is accessible radially from the outside and is closed by a bar 68. The bar 68 is fastened to the segment carrier 54 by fasteners such as screws 70. By removing the bar 68, the axial sliding segments 56 in the two half-chains 62, 64 are accessible from the outside and can be pulled up out of the running groove 58 for servicing. The bar 68 is shaped in such a way that the respective uppermost axial sliding segment 56 is fixed in position by closing the opening. In addition or alternatively, the running groove 58 can also be constructed in the upper area in such a way that the segment chains cannot slip (see the projection 72 shown in dashes).

The axial slide bearing 24 will now be described in more detail with reference to FIG. 2.

Eight hydraulic pressure cells 76 (only two are visible in the drawing) are arranged on the side of the segment carrier 54 remote of the thrust collar 36 so as to be distributed over the circumference. These hydraulic pressure cells 76 are flexible in axial direction and the segment carrier 54 is supported against the bearing housing 30 by them. Stated more exactly, the segment carrier 54 of one slide guide 32 is supported against the flange portion 46 of the bearing housing 30, while the segment carrier 54 of the other slide guide 34 is supported against the cover portion 50 of the bearing housing 30. The pressure cells 76 are connected to one another by hydraulic compensation lines 78 which are received in a groove 80 incorporated into the cover portion 50 and flange portion 46 of the bearing housing 30. The pressure cells 76 form a closed hydraulic circuit with an essentially constant total volume on either side of the thrust collar 36 of the shaft 12 by the compensation lines 78. If a tilting of the shaft 12 occurs, the thrust collar 36 also tilts. Individual pressure cells 76 can drop in axially via the closed hydraulic circuit and release a portion of their hydraulic fluid to other pressure cells 76, which deflect axially in a corresponding manner. Therefore, the segment carriers 54, following the tilt of the thrust collar 36, also tilt and accordingly compensate for the tilting of the shaft 12. Therefore, the individual axial sliding segments 56 are loaded uniformly even when a tilting of the shaft 12 occurs. Therefore, neither tilting nor uneven wear can occur in the axial slide bearing 24. The axial thrust of the shaft is received in a uniform manner over the circumference of the bearing housing 30 (of the cover portion 50 and flange portion 46) via the pressure cells 76 and is conducted into the supporting structure 22 of the pod 16.

Although it is not shown in the drawing, a regulating device by which the total amount of, and the pressure of, the hydraulic fluid within each of the two hydraulic circuits can be preset to suitable values can be provided. In this way, the bearing play and any pressing pressure can be adjusted very accurately. A device for readjusting the preset values during operation can also be provided in order to compensate for possible leakage losses.

As can further be seen from the drawing, the bearing housing 30 is divided at a horizontal center plane 82 into a top shell 84 and a bottom shell 86. The center plane 32 extends through the bearing axis which ideally is identical with the shaft axis C (the position of the center plane 82 is illustrated in the drawing by the two aid lines D, D' parallel to the shaft axis C and the aid lines E, E' perpendicular thereto). The top shell 84 and bottom shell 86 are connected to one another by suitable fasteners such as screws 88. An exact alignment is possible by pins (not shown) which are received in fit bore holes 90. The center plane 82 is also shown in FIG. 3 because the segment guide 54 is also divided at this plane into a top part and bottom part. Because the entire bearing is split horizontally, it is possible to perform maintenance work on the bearing and shaft 12 and even to remove the shaft 12 without having to detach the entire axial slide bearing 24 from the supporting structure 22 of the pod 16. This obviates a costly alignment of the shaft axis C at the supporting structure 22 along with a complete dismantling of the shaft 12.

Figure 4:
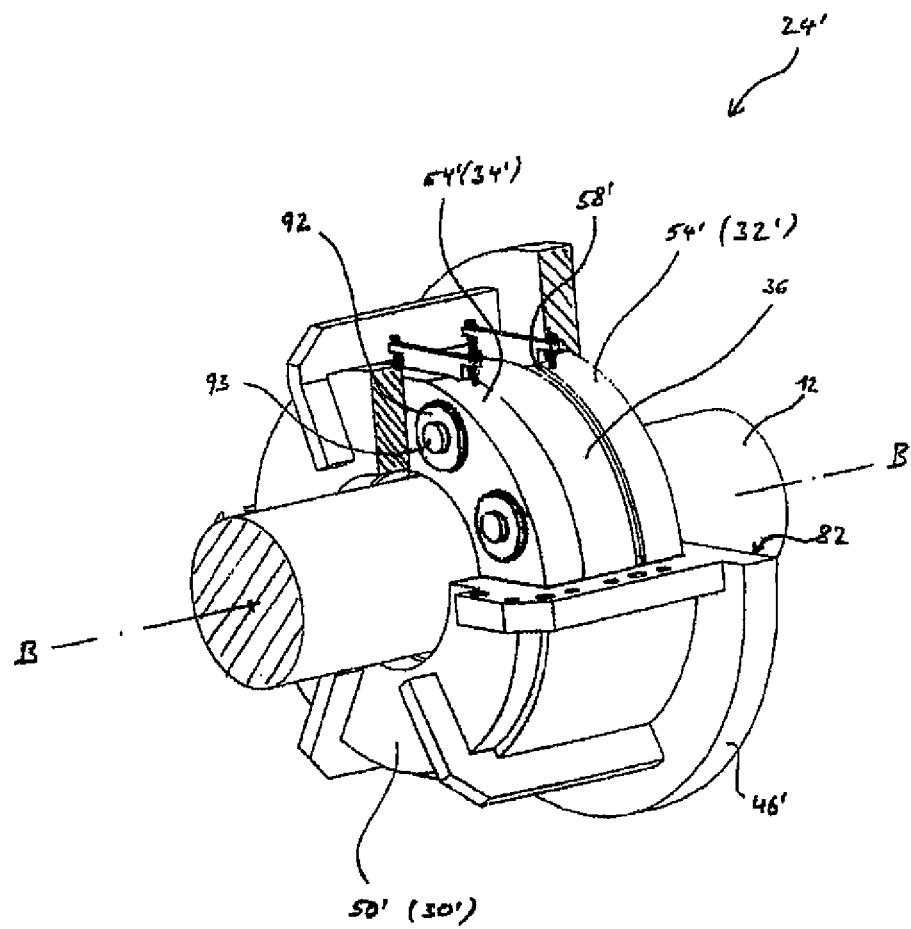
FIG. 4 is a construction of an axial slide bearing according to a second embodiment of the invention with a springingly supported segment guide.

FIG. 4 shows a construction of an axial slide bearing 24' in a second preferred embodiment form of the invention with springingly supported segment guides. The view and perspective correspond to those of FIG. 2.

The axial slide bearing 24' shown in FIG. 4 is similar in construction to the axial slide bearing 24 shown in FIG. 2 and FIG. 3; accordingly, only the differences between them will be discussed in detail.

The axial slide bearing 24' has a housing 30' in which slide guides 32', 34' are arranged for axial support of the thrust collar 36 of the shaft 12. The slide guides 32', 34' substantially comprise segment carriers 54', axial sliding segments (not shown in FIG. 4) being received in the running grooves 58' of these segment carriers 54'. The axial sliding segments and their arrangements in the segment carriers 54' correspond to the configuration in the preceding embodiment form and for this reason will not be described in further detail. Again, the entire bearing can be divided in the center plane 82.

In this embodiment form, the segment carriers 54' are supported against the flange portion 46' and the cover portion 50' of the housing 30' by spring sets 92. The spring sets 92 are received in recesses in the segment carrier 54'. In the present instance, owing to the high loads to be supported, the spring sets 92 are constructed as disk spring sets sitting on studs 93 which project out of the recesses.

Figure 5:
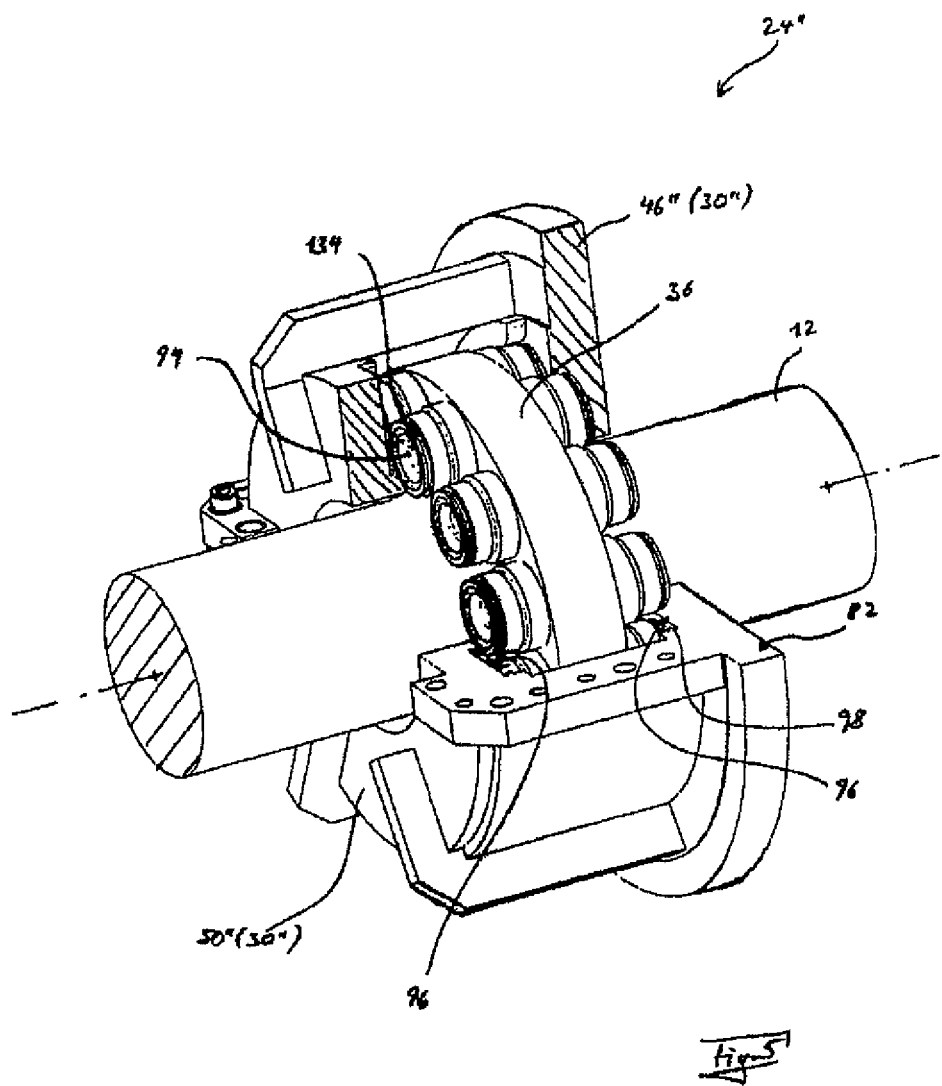
FIG. 5 is a construction of an axial slide bearing according to a third embodiment of the invention with a spring-suspended segment guide.

FIG. 5 shows a construction of an axial slide bearing 24'' in a third preferred embodiment form of the invention with spring-suspended axial sliding segments. The view and perspective correspond to those in FIG. 2 and FIG. 4, but as seen more from above.

Figure 7:
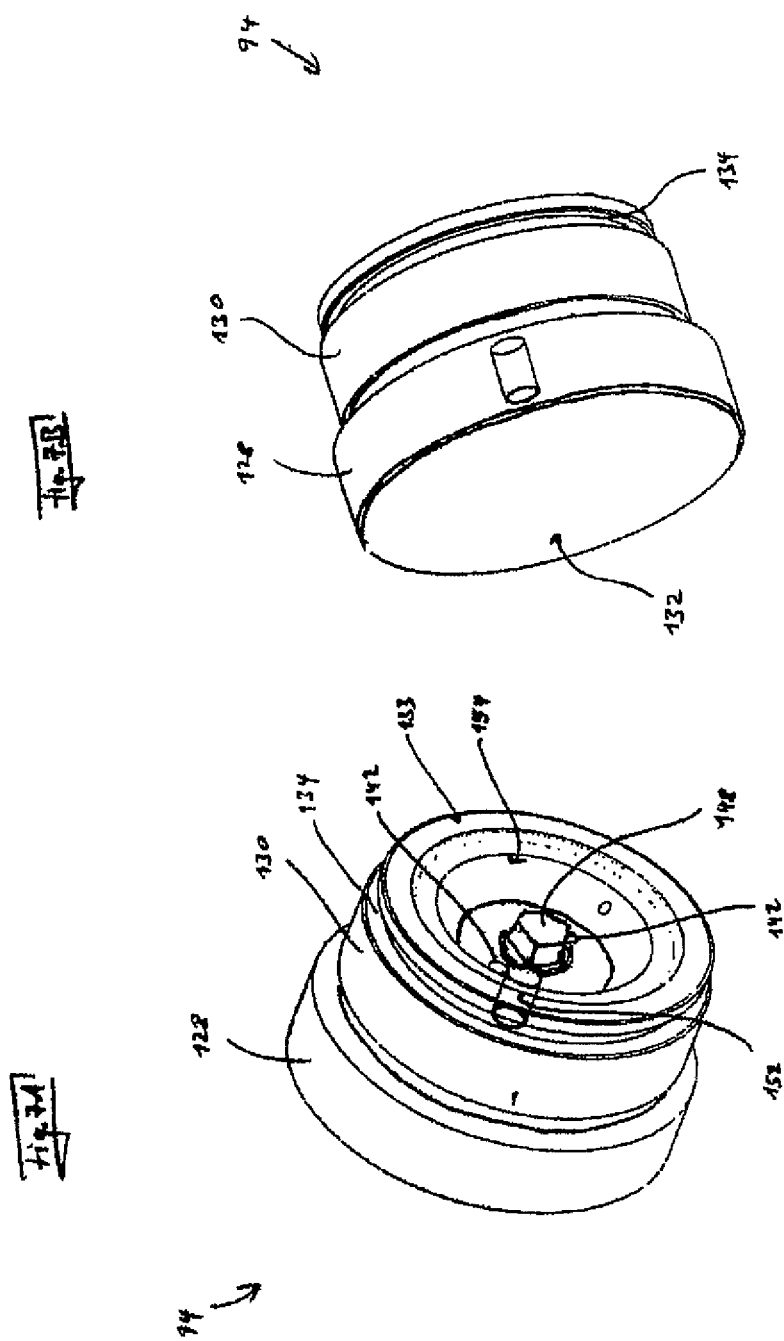
FIGS. 7A, 7B are an axial sliding segment according to the embodiment shown in FIG. 5 or FIG. 6 from two different perspectives.

The axial slide bearing 24'' according to this embodiment form is similar to the slide bearings 24 and 24' of the first and second embodiment forms with respect to its basic construction. In contrast to the latter, however, there is no segment carrier which is separate from the bearing housing and supported therein. Instead, running grooves 96 in which special spring axial sliding segments 94 are arranged are provided in the flange portion 46'' and the cover portion 50'' of the bearing housing 30'' of the axial slide bearing 24''. The arrangement of the spring axial sliding segments 94 and the construction of the running grooves 96 correspond to the arrangement in the segment carriers 54 of the first embodiment form as is shown in FIG. 3; the description relating to this applies analogously. An annular guide rib 98 whose purpose is to guide the spring axial sliding segments 94 and prevent them from falling out is formed in the groove flanks at a slight distance from the base of the running grooves 96. These spring axial sliding segments 94 have corresponding counter-grooves or guide grooves 134 in which the guide ribs 98 engage (FIG. 7a).

Further, the spring axial sliding segments 94 have integrated spring sets which allow them flexibility in axial direction. These and other details of the spring axial sliding segments 94 will be described later in connection with FIGS. 7A, 7B and 8.

Figure 6:
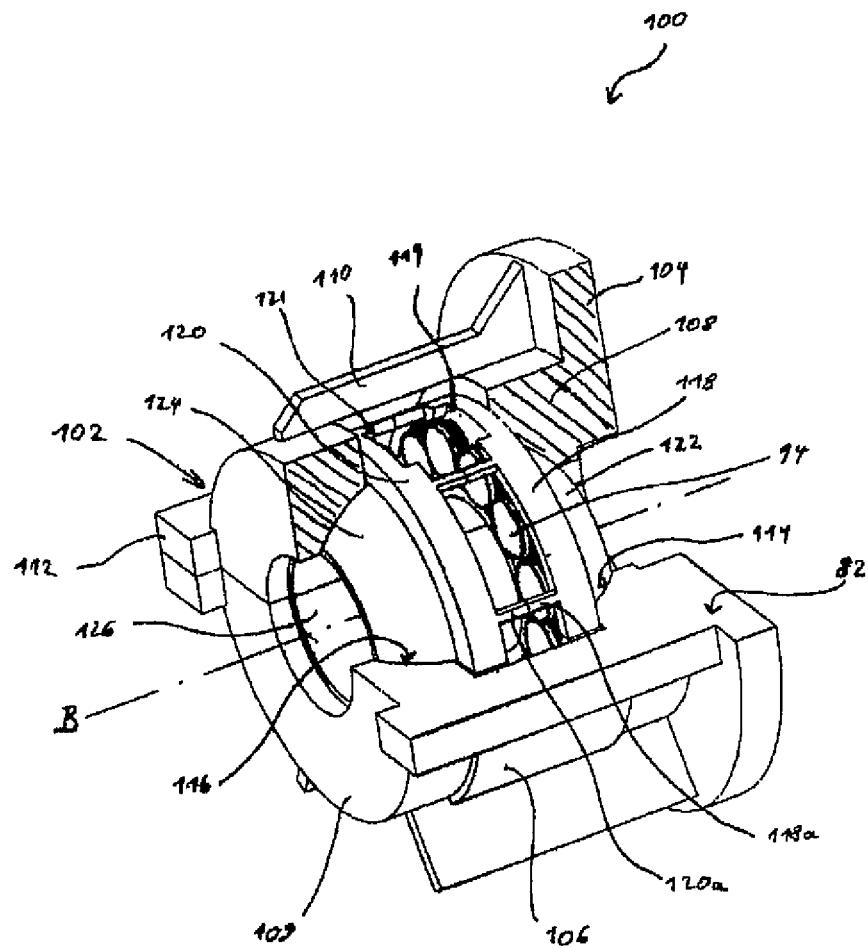
FIG. 6 is a construction of an axial/radial slide bearing according to fourth embodiment of the invention with spherical adjustability.

First, however, the use of the spring axial sliding segments 94 in a combined radial/axial slide bearing 100 with spherical adjustability in a fourth embodiment form of the invention will be described. A radial/axial slide bearing 100 of this kind is shown in FIG. 6. The view and perspective correspond to FIG. 5, but the shaft 12 with the thrust collar 36 is not shown in the drawing for the sake of clarity.

According to FIG. 6, a bearing housing 102 of the radial/axial slide bearing 100 has successively in this order: a flange portion 104, a first supporting portion 108, a shell portion 106, a second supporting portion 109, and rib portions 110, 112. The flange portion 104 is provided in a manner known per se to fasten the bearing housing 102 to the supporting structure 22 of the pod 16. The shell portion 106 has a somewhat larger outer diameter than the first supporting portion 108 and the second supporting portion 109 and surrounds the interior of the bearing 100 as a cylindrical shell.

The bearing 100 is divided in its entirety at the center plane 82 into a top shell and a bottom shell as has already been described in connection with the first embodiment form. Proceeding from the flange portion 104, rib portions 110,112 encompass the first supporting portion 108, the shell portion 106 and the second supporting portion 109 and are suitable for increasing the rigidity of the bearing housing 102 as a whole. Rib portions 112 which adjoin the center plane 82 of the bearing 100 and receive the connecting elements (not shown in more detail) for connecting the top shell and bottom shell are thicker than other rib portions 110.

The radially inner side of the supporting portions 108, 109 each have a spherical-segment-shaped supporting surface 114, 116. The supporting surface 114 of the first supporting portion 108 and the supporting surface 116 of the second supporting portion 109 lie on a common imaginary spherical surface whose function will be described in the following.

As in the first and second embodiment forms, segment carriers 118, 120 are provided respectively on either side of the thrust collar 36 of the shaft 12 in the present embodiment form. Each segment carrier 118, 120 has a running groove 119, 121 for receiving axial sliding segments as is described in connection with the first embodiment form and shown particularly in FIG. 3. The segment carriers 118, 120 support spring axial sliding segments 94 such as are also used in the third embodiment form and which slidingly support the thrust collar 36 of the shaft 12. The segment carriers 118, 120 are supported against one another at webs 118a, 120a which project in axial direction at the radially outer edge from the end faces of the segment carriers 118, 120 facing one another. Of course, the webs 118a, 120a are arranged radially outside the thrust collar 36 (not shown in this drawing).

On the side remote of the thrust collar 36 of the shaft 12, spherical extensions 122, 124 are integral with each segment carrier 118, 120. This spherical extension 122, 124 has a spherical-segment-shaped outer surface, the outer surfaces of the spherical extensions 122, 124 lying on a common imaginary spherical surface which corresponds to the spherical surface of the supporting surface 114, 116 of the supporting portions 108, 109. The outer surface of the spherical extension 122 fits into the supporting surface 114 of the first supporting portion 108 and is supported therein so as to be spherically movable, while the outer surface of the spherical extension 124 fits into the supporting surface 116 of the second supporting portion 109 and is supported therein so as to be spherically movable. In this way, the spherical extensions 122, 124 with the supporting surfaces 114, 116 of the supporting portions 108, 109 form a symmetrical spherical cap guide for the segment carriers 118, 120.

On the radially inner side of the spherical extensions 122, 124 is provided a bearing ring 126 in which the shaft 12 is supported by its radially outer side. A spherically adjustable radial/axial slide bearing is realized in this way. In so doing, tilting in the shaft is compensated largely by the spherical cap guide, since the entire assembly can deflect spherically. Residual and/or temporary tilting or axial shocks are absorbed by the axially resilient spring axial sliding segments 94, wherein the spring axial sliding segments 94 of the opposite side follow the deflecting thrust collar 36. Local overloading and unwanted bearing play are prevented, the axial sliding segments contact the thrust collar with constant, predetermined and adjustable pressure, and a possible lubricant film is not stripped off.

Figure 8:
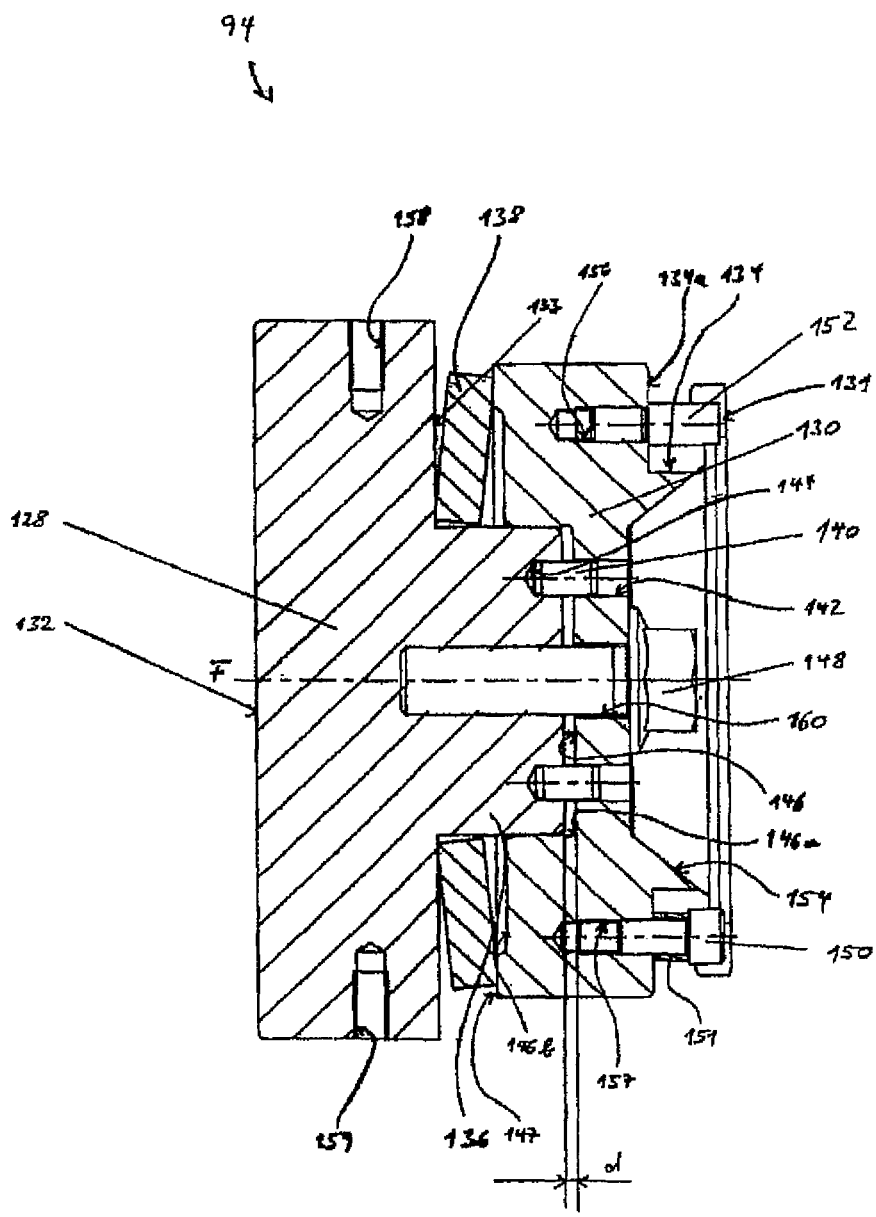
FIG. 8 is the axial sliding segment from FIG. 7A or FIG. 7B in axial section.

The particular spring axial sliding segments 94 of the third and fourth embodiment forms will be described with reference to FIG. 7A, FIG. 7B, and FIG. 8. FIGS. 7A and 7B show the spring axial sliding segment 94 according to the embodiment form of FIG. 6 from two different perspectives, while FIG. 8 shows the segment in axial section.

First, FIGS. 7A and 7B show a spring axial sliding segment 94 which is used in the invention according to the third and fourth embodiment forms in an overview from two different perspectives. The spring axial sliding segment 94 has, as main components, a sliding member 128 and a locking and supporting member 130 which are arranged substantially axially one behind the other and are fastened to one another so as to be flexible under preloading. The sliding member 128 has a sliding surface 132 on a front side which faces the thrust collar 36 of the shaft 12 in the installed state (to simplify orientation, a direction facing toward the thrust collar 26 is designated as front and the opposite direction is designated as rear). At the rear axial end, the locking and supporting member 130 has a supporting surface 131 by which the axial force is transmitted to the bearing housing and segment carrier.

An annular guide groove 134 is incorporated in a radial outer surface of the locking and supporting member 130 at a slight distance from the supporting surface 131. The guide groove 134 encompasses the guide rib 98 (FIG. 6) in the installed state and, in cooperation with the latter, prevents the spring axial sliding segment 94 from falling out of the segment guide.

Further, FIG. 7A shows a depression 154 in the rear side of the locking and supporting member 130 in which can be seen a clamping screw 148 and through-holes 142 for receiving locking pins 148. These locking pins and a screw-in roller 152 for coupling a plurality of segments to form a chain will be described in more detail with reference to FIG. 8.

FIG. 8 shows an axial sectional view of the spring axial sliding segment from FIGS. 7A, 7B.

As can be clearly seen in the drawing, the sliding member 128 is a substantially cylindrical body with a step 136 on its rear side opposite the sliding surface 132. The step 136 serves as a receiving mandrel for a disk spring 138 which is slid onto the step 136 with abundant play and rests with its inner edge on a rear end face of the main body 128 forming a spring bearing surface 133.

The locking and supporting member 130 is likewise a substantially cylindrical body. It has a front recess 146 with an undercut 146a and a step 146b, a rear recess 154 with conical flanks, but with a plane base, and the guide groove 134 which has already been described above. The front recess 146 has an inner diameter which corresponds to the outer diameter of the step 136 of the sliding member 128 and is displaceably slid onto the step 136. The step 146b of the recess 146 defines a circular pressure surface 147 at which the disk spring 138 abuts by its outer edge.

The locking and supporting member 130 has a central through-hole 160 through which clamping screw 148 is inserted from the rear, i.e., proceeding from the rear recess 154, and is screwed into a central threaded blind hole (FIG. 8) in the rear end face of the sliding member 128. By tightening or loosening the clamping screw 148, the disk spring 138 is preloaded and a distance "d" between the rear end face of the sliding member 128 and the base surface of the recess 146 is defined and adjusted. The clamping screw 148 is a cylindrical screw and has a broadened head support to discourage unintentional loosening of the screw. To this end and for fine adjustment of the distance d, the clamping screw 148 can also have a fine thread; further, additional securing means for preventing rotation can be provided. The rear recess 154 is deeper than the height of the head of the clamping screw 148 so that the latter is received in its entirety in the recess 154.

Two pins 140 sit in blind holes 144 which are arranged diagonally opposite one another in the rear side of the step 136 of the sliding member 128, these blind holes 144 communicating with through-holes 142 which are arranged in a corresponding manner in the base surface of the front recess 146 of the locking and supporting member 130. When the locking and supporting member 130 is placed on the sliding member 128, the pins 140 engage in the through-holes 142 and prevent rotation between the sliding member 128 and the locking and supporting member 130.

A threaded blind hole 156 is arranged in a rearward-facing flank 134a of the guide groove 134, a screw-in pin 152 being screwed into this threaded blind hole 156. Provided diagonally opposite the latter is a threaded blind hole 157 into which is screwed a cylindrical screw 150 with a sleeve 151 which is slid on below it. The screw-in pin 152 has a screw thread at one end and a cylindrical portion at the other end, this cylindrical portion having a larger outer diameter than that of the screw thread. The screw-in pin 152 and the cylindrical screw 150 with sleeve 151 serve to fasten connectors such as links or multi-link articulated constructions by which a plurality of spring axial sliding segments 94 can be connected to form chains or half-chains (see the description referring to FIG. 3).

It should be noted that the currently preferred embodiment forms of the present invention described above are shown by way of example and cannot serve to limit the invention to the details and combinations represented therein. Rather, numerous modifications and combinations are possible based on the inventive concept, some of which will be briefly outlined in the following.

In all of the embodiment forms, the axial sliding segments are connected to form chains or half-chains as in the first embodiment form in the manner described in connection with FIG. 3. These arrangements apply analogously for the respective segment guides which are either incorporated in the bearing housing itself or constructed as independent segment carriers.

The spring axial sliding segments 94 can be used in the axial slide bearings 24, 24' of the first and second embodiment forms instead of the simple axial sliding segments 56. In this case, the spring characteristics of the spring axial sliding segments 94 and the viscous elasticity of the hydraulic circuit of the axial slide bearing 24 and the spring characteristics of the spring sets 92 of the axial slide bearing 24' can be adapted to one another in such a way that shaft tilting is compensated mainly by the hydraulic pressure cells 76 and the spring sets 92, respectively, while axial load fluctuations are absorbed by the spring axial slide bearings.

Conversely, in the fourth embodiment form, simple non-springing axial sliding segments 56 can also be used in the radial/axial slide bearing 100, since shaft tilting is already substantially compensated by the spherical cap guide in this case.

It was explained with reference to the third and fourth embodiment forms that the spring axial sliding segments 94 are supported by a supporting surface 131 at the base of a running groove 96, 119, 121 forming the segment guide and are secured in their axial position by a guide rib 98 in the running groove 96, 119, 121 and by a guide groove 134 incorporated in the segment. Alternatively, the guide rib 98 can be designed as a supporting rail to which the axial load of the spring axial sliding segments 94 is transmitted during operation by a flank of the guide groove 134.

These ideas can be applied to the axial slide bearings of all of the embodiment forms. In particular, the simple axial sliding segments 56 of the first and second embodiment forms can also have, in their outer circumferential surface, guide grooves in which corresponding guide ribs or supporting rails engage in the running groove.

It was described in connection with the spring axial sliding segment 94 that a disk spring 138 is inserted between the sliding member 128 and the locking and supporting member 130. Of course, instead of this, a disk spring set in which a plurality of disk springs are arranged in series, in parallel or in a combination thereof can also be used. The choice is made on the basis of the required supporting force and the required spring path depending upon the given factors. When lower forces are expected, it is also conceivable to use cylindrical helical springs or conical helical springs.

Further, a screw-in pin 152 and a sleeve 151 secured to a cylindrical spring 150 which are arranged diagonally opposite one another were used above for the articulation of connecting means between a plurality of axial sliding segments. Of course, two screw-in pins or two sleeves secured by screws can also be used instead. The screw-in pin can also be constructed as a screw-in roller; further, the sleeve 151 can be secured by the screw 150 so as to be fixed or loosely movable.

Although this was shown and described in particular only in connection with the fourth embodiment form, each of the axial slide bearings 24, 24', 24" of the first embodiment form to the third embodiment form can be combined with a radial slide bearing which is received within the respective bearing housing.

Each radial slide bearing can be constructed with a spherical cap guide whether or not it is integrated with the axial slide bearing in a bearing assembly. When integrated in a bearing assembly, the spherically movable radial bearing arrangement can also be provided eccentric to the axial bearing arrangement. In all cases in which the axial slide bearing arrangement is not spherically movable symmetrically to the radial bearing arrangement, a radial displacement of the thrust collar 36 is to be taken into account in the event of bending of the shaft; this must then be allowed for in the design of the segment guides and the bearing housing.

The axial sliding segments 56, 94 have been shown and described within the framework of this description as cylindrical bodies. Alternatively, axial sliding segments with other cross-sectional shapes such as hexagonal or annular segment-shaped cross sections can also be used provided the essential features of the invention such as, e.g., the axial flexibility of the segments and/or segment carriers, the spherical movability of at least one of the radial slide bearing arrangements, etc. are present. In the case of axial sliding segments with an annular-segment-shaped cross section, the connections between the individual segments need not be constructed in an articulated manner; the individual segments can also abut tightly and be connected to each other in a suitable manner.

Twelve axial sliding segments per segment guide were described in the embodiment forms. However, the quantity selected is essentially optional and depends upon circumstances. It is advantageous when the quantity and size are selected such that the horizontal divisibility of the bearing is not impaired. Therefore, an integer multiple of four is the best option for the quantity of segments. However, at least three segments are to be provided so that their respective sliding surfaces define a plane. This also applies to the hydraulic pressure cells and the spring sets in the first and second embodiment forms.

Further, the segment guides described in the embodiment forms have been in the form of a running groove in which the axial sliding segments are arranged so as to be connected to one another. However, a segment guide can also be realized in such a way that recesses in which axial sliding segments are received individually are incorporated into the bearing housing or the segment carrier.

Although it is not shown in detail in the drawings, the segment carriers 54, 54', 118, 120 are secured in the respective bearing housings so as to be prevented from rotating along with the shaft 12. The task of preventing rotation can be performed by the bars 68; but other securing means such as pins, keys, or the like can also be used.

Articulated links 60 for connecting individual axial sliding segments 64 are shown in FIG. 3. Alternatively, multi-link connecting elements or connecting elements which are pliant with respect to bending and compression can also be used between respective axial sliding segments. In this case, however, the two half-chains are fixed in the upper area so that the two half-chains do not collapse under the influence of gravity. This can be accomplished by suitable shaping of the running groove 58 (see the catches 73 which are provided on both sides and are indicated in the upper left-hand area of the drawing by dotted lines; clearly, these catches 73 require a different shape of the opposite flank of the running groove and, as the case may be, of the bar; see the bulge 74 which is likewise indicated by dotted lines). Alternatively or as additional securing steps, or to facilitate removal of the half-chains, the respective topmost axial sliding segments 56 can be fastened to the bar 68 so that they can be handled together. In this case, the web 66 in the lower area of the running groove 58 can also be omitted.

The disk spring sets 92 in FIG. 4 are received in recesses in the segment carrier 54'; conversely, they can also be received in recesses in the flange portion 46' or cover portion 50' of the housing 30'.

The supporting structure 22 of the pod 16 is constructed in a streamlined shape in FIG. 1; but it can also be constructed as a framework structure with a streamlined cladding.

Although the invention is shown herein in connection with a swivelable pod, the invention can also be used on rigid pods.

The pods 16 can preferably be walked upon for maintenance purposes and are accessible from the outside via watertight hatches or from the inside of the ship, for example, by way of the pod suspension 18.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A propeller pod drive for a vessel, comprising:
a driveshaft configured to drive a propeller;
a radial bearing arrangement configured to receive radial forces of the driveshaft;
an axial bearing arrangement configured to receive axial forces of the driveshaft;
a guide device;
a thrust collar of the driveshaft configured to be supported on at least a first side in an axial direction at the guide device; and
a supporting structure configured to arrange the at least one radial bearing arrangement and the axial bearing arrangement,
wherein the guide device has at least three axial sliding segments which are arranged in a segment guide, each the at least three axial sliding segments having a sliding surface in contact with the thrust collar,
wherein the segment guide includes a running groove configured to receive the at least three axial sliding segments,
wherein at least two of the at least three axial sliding segments are connected to one another by a connection arrangement and are movable in circumferential direction inside the running groove.

2. The propeller pod drive according to claim 1, wherein the connection arrangement between the at least two adjacent axial sliding segments has one of articulated links and multi-link chains articulated between the at least two adjacent axial sliding segments.

3. The propeller pod drive according to claim 1, wherein the at least two axial sliding segments are connected to one another in at least two partial strands which are inserted in opposite circumferential directions, into the segment guide.

4. The propeller pod drive according to claim 1, wherein the running groove has a closable opening configured for insertion and removal of the at least three axial sliding segments.

5. The propeller pod drive according to claim 4, wherein the opening is located at a vertically upper side of the segment guide.

6. The propeller pod drive according to claim 1, wherein the axial sliding segments are flexible in axial direction.

7. The propeller pod drive according to claim 6, wherein the axial sliding segments have an axial suspension, configured as one of a disk spring and a disk spring arrangement comprising a plurality of disk springs.

8. The propeller pod drive according to claim 7, wherein the axial suspension has a preloading device configured to adjust a preloading of the axial suspension.

9. The propeller pod drive according to claim 8, wherein each the at least three axial sliding segments have
a respective sliding member with a sliding surface;
a supporting body, wherein the axial suspension is arranged between the sliding member and the supporting body; and
a clamping screw for clamping the supporting body with the sliding member against the force of the axial suspension.

10. The propeller pod drive according to claim 1, wherein the segment guide is incorporated integral with a bearing housing of the axial bearing arrangement.

11. The propeller pod drive according to claim 1, wherein the segment guide has a segment carrier that is supported so as to be axially flexible in a bearing housing at least at three points distributed on the circumference.

12. The propeller pod drive according to claim 11, wherein the support of the segment guide has an axial suspension which is arranged at least at one of at the segment guide and at a bearing housing and has one of a disk spring and a disk spring arrangement formed of a plurality of disk springs.

13. The propeller pod drive according to claim 12, wherein the axial suspension of the support has a preloading device for adjusting a preloading of the axial suspension.

14. The propeller pod drive according to claim 1, wherein one of the radial bearing arrangements is arranged in a bearing housing so as to be spherically movable by a spherical cap.

15. The propeller pod drive according to claim 1, wherein the radial bearing arrangement and the axial bearing arrangement form a common bearing assembly.

16. The propeller pod drive according to claim 15, wherein the radial bearing arrangement in the bearing assembly has two half-bearings arranged symmetrically in axial direction around the axial bearing arrangement.

17. The propeller pod drive according to claim 16, wherein each half-bearing forms a half-cap, the two half-caps arranged symmetrically with respect to the thrust collar in axial direction and together form a spherically movable cap.

18. The propeller pod drive according to claim 17, wherein the segment guides are arranged in each instance one of on the half-caps and integrated therein.

19. The propeller pod drive according to claim 1, wherein the radial bearing arrangement and the axial bearing arrangement have a horizontal joint face that extends parallel to an axis of rotation of the driveshaft and at which the bearing arrangements are configured to be separated and put together.

20. The propeller pod drive according to claim 1, wherein the guide device has an integer multiple of four axial sliding segments arranged in a segment guide and each of which has a sliding surface in contact with the thrust collar.

21. A propeller pod drive for a vessel, comprising:
a driveshaft configured to drive a propeller;
a radial bearing arrangement configured to receive radial forces of the driveshaft;
an axial bearing arrangement configured to receive axial forces of the driveshaft;
a guide device;
a thrust collar of the driveshaft configured to be supported on at least a first side in an axial direction at the guide device; and
a supporting structure configured to arrange the at least one radial bearing arrangement and the axial bearing arrangement,
wherein the guide device has at least three axial sliding segments which are arranged in a segment guide, each the at least three axial sliding segments having a sliding surface in contact with the thrust collar,
wherein the segment guide has a segment carrier that is supported so as to be axially flexible in a bearing housing at least at three points distributed on the circumference, and
wherein the support of the segment guide has one or more hydraulic compensation cells connected to one another by hydraulic lines arranged at least at one of the segment guide and at the bearing housing, wherein the hydraulic compensation cells and the hydraulic lines form a hydraulic circuit.

22. The propeller pod drive according to claim 21, further comprising an adjusting device configured to adjust a total amount of a hydraulic fluid in the hydraulic circuit.

23. The propeller pod drive according to claim 21, further comprising a regulating device configured to regulate a total amount of a hydraulic fluid in the hydraulic circuit.

24. A slide bearing arrangement designed for and geared toward use in propeller pod drive for a vessel, the propeller pod drive comprising:
- a driveshaft configured to drive a propeller;
- a radial bearing arrangement configured to receive radial forces of the driveshaft;
- an axial bearing arrangement configured to receive axial forces of the driveshaft;
- a guide device;
- a thrust collar of the driveshaft configured to be supported on at least a first side in an axial direction at the guide device; and
- a supporting structure configured to arrange the at least one radial bearing arrangement and the axial bearing arrangement,
- wherein the guide device has at least three axial sliding segments which are arranged in a segment guide, each the at least three axial sliding segments having a sliding surface in contact with the thrust collar,
- wherein the segment guide includes a running groove configured to receive the at least three axial sliding segments, and
- wherein at least two of the at least three axial sliding segments are connected to one another by a connection arrangement and are movable in circumferential direction inside the running groove.

25. A vessel comprising:
a propeller pod drive having:
- a driveshaft configured to drive a propeller;
- a radial bearing arrangement configured to receive radial forces of the driveshaft;
- an axial bearing arrangement configured to receive axial forces of the driveshaft;
- a guide device;
- a thrust collar of the driveshaft configured to be supported on at least a first side in an axial direction at the guide device; and
- a supporting structure configured to arrange the at least one radial bearing arrangement and the axial bearing arrangement,
- wherein the guide device has at least three axial sliding segments which are arranged in a segment guide, each the at least three axial sliding segments having a sliding surface in contact with the thrust collar, wherein the vessel is particularly a ship, boat, combat vessel, reconnaissance vessel, submersible, or floating infrastructure,
- wherein the segment guide includes a running groove configured to receive the at least three axial sliding segments, and
- wherein at least two of the at least three axial sliding segments are connected to one another by a connection arrangement and are movable in circumferential direction inside the running groove.

* * * * *